(12) United States Patent
Koshiishi

(10) Patent No.: US 11,167,390 B2
(45) Date of Patent: Nov. 9, 2021

(54) CUTTING FLUID SUPPLYING DEVICE FOR MACHINE TOOL

(71) Applicant: FANUC CORPORATION, Yamanashi (JP)

(72) Inventor: Hikaru Koshiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 16/117,012

(22) Filed: Aug. 30, 2018

(65) Prior Publication Data

US 2019/0118323 A1 Apr. 25, 2019

(30) Foreign Application Priority Data

Oct. 25, 2017 (JP) .............................. JP2017-205902

(51) Int. Cl.
*B23Q 11/14* (2006.01)
*B23Q 11/10* (2006.01)
(Continued)

(52) U.S. Cl.
CPC ...... *B23Q 11/1015* (2013.01); *B23Q 11/0003* (2013.01); *B23Q 11/127* (2013.01);
(Continued)

(58) Field of Classification Search
CPC ............ B23Q 11/1015; B23Q 11/0003; B23Q 11/127; B23Q 11/128; B23Q 11/146; G05B 19/404
(Continued)

(56) References Cited

U.S. PATENT DOCUMENTS 3,303,731 A * 2/1967 Zawistowski ........ B23Q 11/145
82/117
3,554,081 A * 1/1971 Haley ..................... B23B 31/19
409/132
(Continued)

FOREIGN PATENT DOCUMENTS

CN 106166689 A 11/2016
CN 107150258 A 9/2017
(Continued)

OTHER PUBLICATIONS

An Office Action; "Notice of Reasons for Refusal" issued by the Japanese Patent Office dated Jun. 25, 2019, which corresponds to Japanese Patent Application No. 2017-205902 and is related to U.S. Appl. No. 16/117,012; with English Translation.
(Continued)

*Primary Examiner* — Robert F Long
(74) *Attorney, Agent, or Firm* — Studebaker & Brackett PC

(57) ABSTRACT

A cutting fluid supplying device for a machine tool includes a machine tool having a structure body including a bed, a column disposed on the bed, and a spindle head disposed to the column and at least one of the ejection ports for ejecting a cutting fluid. The cutting fluid supplying device for a machine tool further includes a storage tank for storing the cutting fluid to be supplied to the machine tool, at least one of the cutting fluid flow passages for connecting the storage tank and the at least one of the ejection ports, and at least one of the pumps for applying pressure to the cutting fluid to supply the cutting fluid stored in the storage tank to the at least one of the cutting fluid flow passages. The at least one of the cutting fluid flow passages is disposed to penetrate through or disposed on an outer surface of the structure body
(Continued)

so as to allow heat exchange between the cutting fluid and the structure body.

1 Claim, 2 Drawing Sheets

(51) Int. Cl.
*B23Q 11/12* (2006.01)
*G05B 19/404* (2006.01)
*B23Q 11/00* (2006.01)

(52) U.S. Cl.
CPC .......... *B23Q 11/128* (2013.01); *B23Q 11/146* (2013.01); *G05B 19/404* (2013.01)

(58) Field of Classification Search
USPC ................................................. 173/197, 199
See application file for complete search history.

(56) References Cited

U.S. PATENT DOCUMENTS

| | | | | |
|---|---|---|---|---|
| 3,577,808 | A * | 5/1971 | Visser | B23P 25/00 408/61 |
| 4,164,879 | A * | 8/1979 | Martin | B23Q 11/10 407/11 |
| 4,573,833 | A * | 3/1986 | Kondo | G05B 19/42 408/3 |
| 4,928,019 | A * | 5/1990 | Tomikawa | B23Q 15/18 250/559.3 |
| 5,224,051 | A * | 6/1993 | Johnson | G01N 33/2894 700/169 |
| 5,226,475 | A * | 7/1993 | Ruottu | F28D 13/00 165/104.18 |
| 5,265,505 | A * | 11/1993 | Frechette | B23Q 1/0018 29/39 |
| 5,348,430 | A * | 9/1994 | Metz | C21B 7/12 266/271 |
| 5,951,216 | A * | 9/1999 | Antoun | B23Q 11/1038 405/61 |
| 6,039,517 | A * | 3/2000 | Charewicz | B23Q 3/154 269/8 |
| 6,257,811 | B1 * | 7/2001 | Schweizer | B23Q 1/0009 29/27 C |
| 7,182,674 | B2 * | 2/2007 | Mundt | B24B 3/346 451/449 |
| 7,258,167 | B2 * | 8/2007 | Shammai | E21B 49/082 166/264 |
| 9,399,273 | B2 * | 7/2016 | Hoshino | B23Q 11/10 |
| 2005/0236188 | A1 * | 10/2005 | Lah | C10B 33/006 175/67 |
| 2006/0218811 | A1 * | 10/2006 | Sato | G05B 19/404 33/702 |
| 2008/0144693 | A1 * | 6/2008 | Sato | G01K 15/00 374/1 |
| 2008/0267723 | A1 * | 10/2008 | Tezuka | B23Q 11/08 407/115 |
| 2009/0214307 | A1 * | 8/2009 | Nguyen | B23Q 11/0046 408/56 |
| 2010/0183393 | A1 * | 7/2010 | Sato | B23Q 11/141 409/135 |
| 2011/0008121 | A1 * | 1/2011 | Miyazaki | B23Q 11/128 409/135 |
| 2011/0318123 | A1 * | 12/2011 | Leishman | B23Q 11/1076 408/1 R |
| 2012/0308323 | A1 * | 12/2012 | Gardner | B23Q 11/1076 409/84 |
| 2014/0010611 | A1 * | 1/2014 | Yamanishi | B23Q 11/126 409/135 |
| 2014/0069609 | A1 * | 3/2014 | Caihuzac | B23Q 11/128 165/67 |
| 2015/0037110 | A1 * | 2/2015 | Wunderlich | B23Q 5/04 408/1 R |
| 2015/0231751 | A1 * | 8/2015 | Tullman | B23Q 1/012 165/137 |
| 2016/0076794 | A1 * | 3/2016 | Saito | B23Q 11/1053 62/6 |
| 2016/0121445 | A1 * | 5/2016 | Sogabe | B23Q 11/127 |
| 2016/0297042 | A1 * | 10/2016 | Koik | B23Q 11/1076 |
| 2016/0370788 | A1 * | 12/2016 | Bailey, III | H01L 21/67248 |
| 2017/0139432 | A1 * | 5/2017 | Endou | B23Q 11/10 |
| 2017/0182612 | A1 * | 6/2017 | Balaji | B23Q 17/0952 |
| 2018/0021907 | A1 * | 1/2018 | Suzuki | B23Q 5/10 173/217 |
| 2018/0039293 | A1 * | 2/2018 | Pierse | B23Q 11/141 |
| 2018/0056465 | A1 * | 3/2018 | Koshiishi | B25J 11/005 |
| 2018/0071877 | A1 * | 3/2018 | Li | B23Q 11/141 |
| 2018/0135434 | A1 * | 5/2018 | Hall | E21B 4/02 |
| 2018/0258720 | A1 * | 9/2018 | Whan | E21B 21/065 |
| 2019/0054583 | A1 * | 2/2019 | Dirscherl | B23B 47/34 |
| 2019/0056711 | A1 * | 2/2019 | Meier | G05B 19/409 |
| 2019/0061082 | A1 * | 2/2019 | Rose | B23Q 11/1076 |
| 2019/0235470 | A1 * | 8/2019 | Maekawa | G05B 19/406 |
| 2019/0235472 | A1 * | 8/2019 | Maekawa | G05B 19/404 |

FOREIGN PATENT DOCUMENTS

| | | |
|---|---|---|
| GN | 103522075 A | 1/2014 |
| JP | S57-43932 U | 3/1982 |
| JP | S63-042981 Y2 | 11/1988 |
| JP | H1-87845 U | 6/1989 |
| JP | H10-156661 A | 6/1998 |
| JP | H10-230435 A | 9/1998 |
| JP | 2001-054839 A | 2/2001 |
| JP | 2009-136986 A | 6/2009 |
| JP | 2011-073108 A | 4/2011 |

OTHER PUBLICATIONS

An Office Action mailed by the State Intellectual Property Office of the People's Republic of China dated Feb. 25, 2020, which corresponds to Chinese Patent Application No. 201811156039.7 and is related to U.S. Appl. No. 16/117,012.

* cited by examiner

CUTTING FLUID SUPPLYING DEVICE FOR MACHINE TOOL

This application is based on and claims the benefit of priority from Japanese Patent Application No. 2017-205902, filed on 25 Oct. 2017, the content of which is incorporated herein by reference.

BACKGROUND OF THE INVENTION

Field of the Invention

The present invention relates to a cutting fluid supplying device for a machine tool allowing to suppress thermal displacement of a machine tool.

Related Art

It is known that, in a machine tool, thermal displacement occurs in the structure body constituting the machine tool due to various factors such as heat generated by respective motors, frictional heat of a feed axis, machining heat in cutting, and heat transferred from cutting fluid temperature or ambient temperature. If thermal displacement occurs during machining of a workpiece (work material), a relative position between a tool and the workpiece is displaced, which may affect the machine accuracy.

In order to deal with such a problem of thermal displacement of a machine tool, a relative position between a tool and a workpiece is compensated by a thermal displacement compensation program using a temperature sensor, in a conventional method.

It is also known that the cutting fluid rising in temperature during machining is cooled so that the temperature of the cutting fluid becomes identical to the temperature of a machine tool, thereby preventing the thermal displacement of the machine tool caused by a difference in temperature between the cutting fluid and the machine tool (refer to, for example, Patent Document 1).

Patent Document 1: Japanese Unexamined Patent Application, Publication No. H10-156661

SUMMARY OF THE INVENTION

It is difficult to perform compensation using a thermal displacement compensation program sufficiently against a sudden change in ambient temperature due to, for example, outside air entering the installation location of a machine tool or against a change in temperature due to a change of season. For this reason, there is a need to perform a warming-up operation until the temperature of the structure body constituting the machine tool reaches an equilibrium temperature. In addition, such a program needs to be adjusted for each machine tool or for each installation location of the machine tool. Accordingly, there is a problem that the cost of a change in program is also present in addition to the cost of a temperature sensor.

The technique described in Patent Document 1, in which the temperature of cutting fluid and the temperature of a machine tool are made identical to each other, has a problem that the thermal displacement caused by a change in temperature of the machine tool itself is not able to be suppressed.

The object of the present invention is to provide a cutting fluid supplying device for a machine tool in a simple configuration allowing to suppress thermal displacement of a machine tool.

(1) A cutting fluid supplying device for a machine tool (for example, a cutting fluid supplying device 100 described below) according to the present invention includes a machine tool (for example, a machine tool 1 described below) having a structure body (for example, a structure body 10 described below) including a bed (for example, a bed 11 described below), a column (for example, a column 12 described below) disposed on the bed, and a spindle head (for example, a spindle head 13 described below) disposed to the column and at least one ejection port (for example, an ejection port Tb, an ejection port 16*a*, or an ejection port 17*a* described below) for ejecting a cutting fluid (for example, a cutting fluid F described below), a storage tank (for example, a storage tank 2 described below) for storing the cutting fluid to be supplied to the machine tool, at least one cutting fluid flow passage (for example, a first cutting fluid flow passage 3, a second cutting fluid flow passage 4, or a third cutting fluid flow passage 5 described below) connecting the storage tank and the ejection port, and at least one pump (for example, a spindle center-through ejection pump 21, a cutting fluid ejection pump 22, or a machine interior cleaning pump 23 described below) for applying pressure to the cutting fluid to supply the cutting fluid stored in the storage tank to the cutting fluid flow passage. The cutting fluid flow passage is disposed to penetrate through or disposed on an outer surface of the structure body so as to allow heat exchange between the cutting fluid and the structure body.

(2) The cutting fluid supplying device for a machine tool according to (1) may further include at least one temperature sensor (for example, a first temperature sensor 11*a*, a second temperature sensor 12*a*, or a third temperature sensor 13*a* described below) for detecting a temperature of the structure body, and at least one temperature control device (for example, a first temperature control device 24 or a second temperature control device 25 described below) for adjusting a temperature of the cutting fluid stored in the storage tank so as to make the temperature of the structure body detected by the temperature sensor identical to a predetermined temperature.

(3) In the cutting fluid supplying device for a machine tool according to (1) or (2), the cutting fluid flow passage may have a first cutting fluid flow passage (for example, a first cutting fluid flow passage 3 described below) disposed to penetrate through or disposed on an outer surface of the spindle head so as to allow heat exchange between the cutting fluid and the spindle head.

(4) In the cutting fluid supplying device for a machine tool according to (1) or (2), the cutting fluid flow passage may have a second cutting fluid flow passage (for example, a second cutting fluid flow passage 4 described below) disposed to penetrate through or disposed on an outer surface of the column so as to allow heat exchange between the cutting fluid and the column, and a third cutting fluid flow passage (for example, a third cutting fluid flow passage 5 described below) disposed to penetrate through or disposed on an outer surface of the bed so as to allow heat exchange between the cutting fluid and the bed.

(5) In the cutting fluid supplying device for a machine tool according to (2), the cutting fluid flow passage may have a first cutting fluid flow passage (for example, a first cutting fluid flow passage 3 described below) disposed to penetrate through or disposed on an outer surface of the spindle head so as to allow heat exchange between the cutting fluid and the spindle head, a second cutting fluid flow passage (for example, a second cutting fluid flow passage 4 described below) disposed to penetrate through or disposed on an outer surface of the column so as to allow heat exchange between the cutting fluid and the column, and a third cutting fluid flow passage (for example, a third cutting fluid flow passage 5 described below) disposed to penetrate through or disposed on an outer surface of the bed so as to allow heat exchange between the cutting fluid and the bed. The temperature control device may have a first temperature control device (for example, a first temperature control device 24 described below) for adjusting the temperature of the cutting fluid to be supplied to the first cutting fluid flow passage and the second cutting fluid flow passage, respectively, and a second temperature control device (for example, a second temperature control device 25 described below) for adjusting the temperature of the cutting fluid to be supplied to the third cutting fluid flow passage. Each of the first temperature control device and the second temperature control device may be capable of independently controlling the temperature of the cutting fluid.

The present invention enables to provide a cutting fluid supplying device for a machine tool in a simple configuration allowing to suppress thermal displacement of a machine tool.

DETAILED DESCRIPTION OF THE INVENTION

Figure 1:
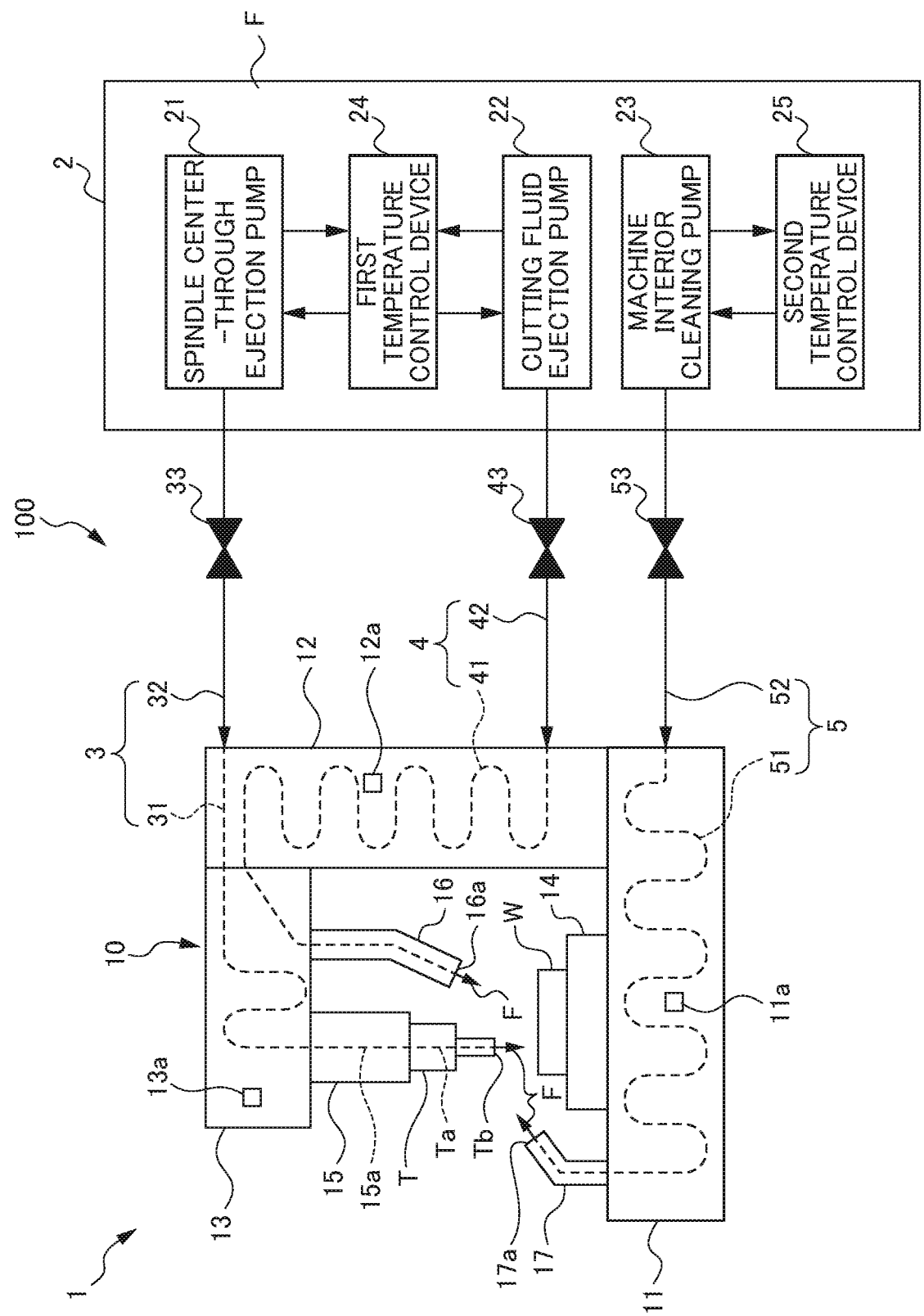
FIG. 1 is a diagram illustrating a schematic configuration of a cutting fluid supplying device for a machine tool according to one embodiment of the present invention.
Figure 2:
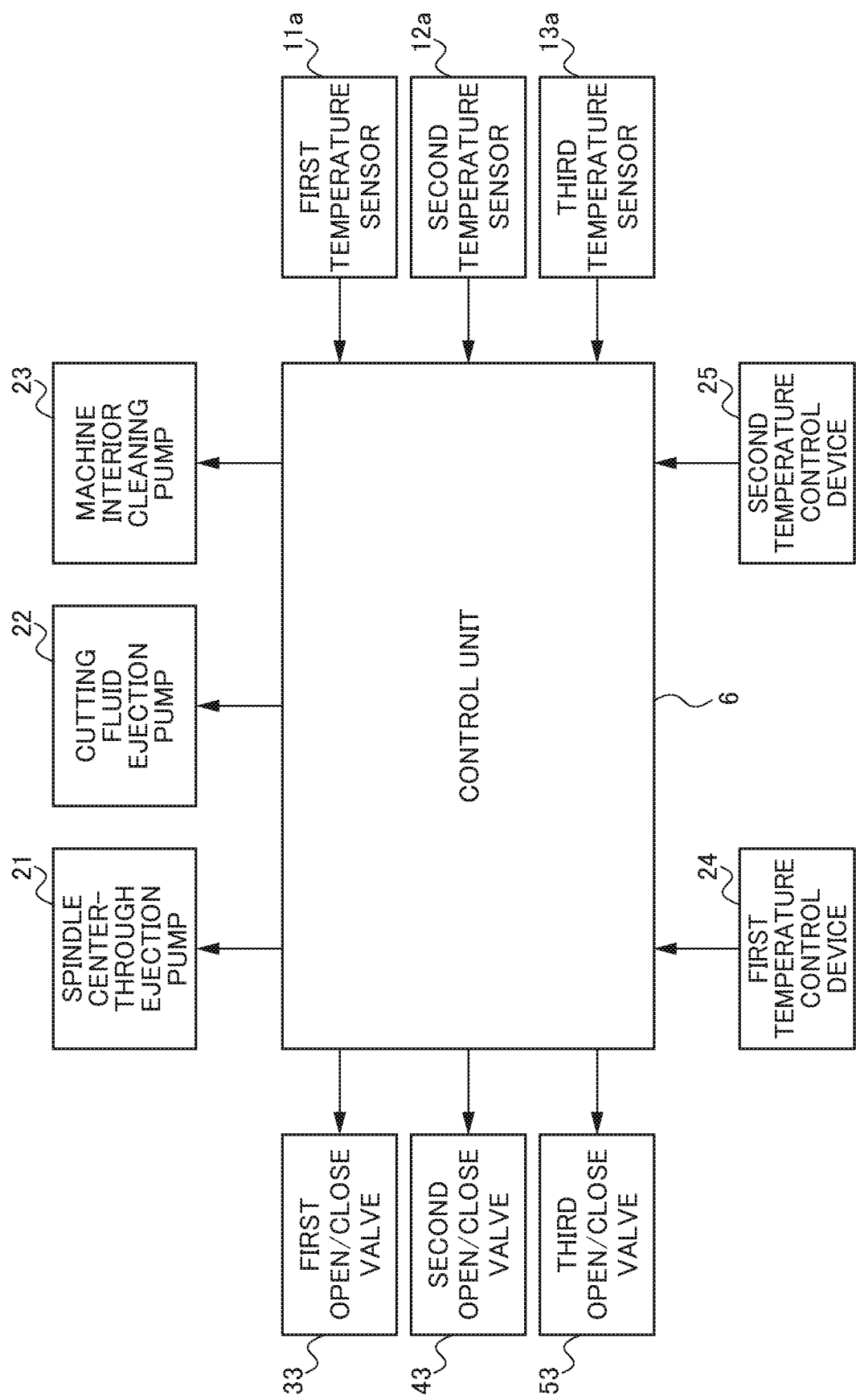
FIG. 2 is a block diagram illustrating a control configuration in the cutting fluid supplying device for the machine tool shown in FIG. 1.

An embodiment of the present invention will be described below with reference to the drawings. FIG. 1 is a diagram illustrating a schematic configuration of a cutting fluid supplying device for a machine tool according to one embodiment of the present invention. FIG. 2 is a block diagram illustrating a control configuration in the cutting fluid supplying device for the machine tool shown in FIG. 1. A cutting fluid supplying device 100 for a machine tool shown in FIG. 1 is a device for supplying a cutting fluid F stored in a storage tank 2 to a machine tool 1.

The machine tool 1 includes a structure body 10 including a bed 11, a column 12 disposed so as to stand on the bed 11, and a spindle head 13 connected to an upper end portion of the column 12. A table 14 is disposed on the bed 11 so as to be rotatable and movable in a horizontal direction, and a workpiece W serving as work material is placed on the table 14.

The spindle head 13 extends laterally from the upper end portion of the column 12. A spindle 15 extending downward toward the table 14 is attached to the lower surface of the distal end side of the spindle head 13. An in-spindle flow passage 15a allowing the cutting fluid F to flow through is formed inside the spindle 15.

A tool T is detachably attached to the lower end portion of the spindle 15. The tool T includes an in-tool flow passage Ta which penetrates through the tool T in the axial direction thereof (in a vertical direction in FIG. 1) and allows the cutting fluid F to flow through. One end side of the in-tool flow passage Ta communicates with the in-spindle flow passage 15a, while the other end side thereof is opened at the distal end of the tool T to form a tool ejection port Tb.

The in-tool flow passage Ta allows the cutting fluid F supplied from the storage tank 2 through the in-spindle flow passage 15a to flow through and ejects the cutting fluid F from the tool ejection port Tb to a machining point on the workpiece W, thereby blowing away chips and the like generated during machining. In the machine tool 1 according to the present embodiment, a spindle center-through flow passage, which allows the cutting fluid F to flow through the spindle, is configured with the in-spindle flow passage 15a and the in-tool flow passage Ta.

A cutting fluid ejection nozzle 16 is disposed on a side of the spindle 15 close to the spindle 15. The cutting fluid ejection nozzle 16 ejects the cutting fluid F supplied from the storage tank 2 from a cutting fluid ejection port 16a toward the workpiece W or the periphery thereof, thereby washing away chips and the like adhering to the workpiece W or the periphery thereof during machining.

A machine interior cleaning nozzle 17 is disposed on the upper surface of the bed 11. The machine interior cleaning nozzle 17 ejects the cutting fluid F as a cleaning fluid from a cleaning fluid ejection port 17a disposed at the tip thereof toward the workpiece W on the table 14 or the periphery thereof, thereby washing away chips and the like on the workpiece W or the bed 11 in the periphery of the workpiece W.

A first in-structure cutting fluid flow passage 31 is formed from the inside of the column 12 to the inside of the spindle head 13 of the machine tool 1. One end side of the first in-structure cutting fluid flow passage 31 is opened outward on the upper end side surface of the column 12. The other end side of the first in-structure cutting fluid flow passage 31 laterally penetrates the inside of the column 12, extends so as to wind through the inside of the spindle head 13 toward the distal end side thereof, and communicates with the in-spindle flow passage 15a formed in the spindle 15. The first in-structure cutting fluid flow passage 31 is configured with a hole formed in a tubular shape from the inside of the column 12 to the inside of the spindle head 13. Accordingly, the cutting fluid F flowing through the first in-structure cutting fluid flow passage 31 is able to exchange heat with the column 12 and the spindle head 13.

A second in-structure cutting fluid flow passage 41 is also formed from the inside of the column 12 to the inside of the spindle head 13 of the machine tool 1. One end side of the second in-structure cutting fluid flow passage 41 is opened outward on the lower end side surface of the column 12. The other end side of the second in-structure cutting fluid flow passage 41 extends so as to wind through the inside of the column 12 toward the upper end side, penetrates the inside of the spindle head 13 and communicates with the cutting fluid ejection nozzle 16. The second in-structure cutting fluid flow passage 41 is configured with a hole formed in a tubular shape from the inside of the column 12 to the inside of the spindle head 13. Accordingly, the cutting fluid F flowing through the second in-structure cutting fluid flow passage 41 is able to exchange heat with the column 12 and the spindle head 13.

A third in-structure cutting fluid flow passage 51 is also formed inside the bed 11 of the machine tool 1. One end side of the third in-structure cutting fluid flow passage 51 is opened outward on the surface of the bed 11. The other end side of the third in-structure cutting fluid flow passage 51 extends so as to wind through the inside of the bed 11, and communicates with the machine interior cleaning nozzle 17. The third in-structure cutting fluid flow passage 51 is configured with a hole formed in a tubular shape inside the bed 11. Accordingly, the cutting fluid F flowing through the third in-structure cutting fluid flow passage 51 is able to exchange heat with the bed 11.

As shown in FIG. 1, the cutting fluid supplying device 100 includes a first temperature sensor 11*a* disposed inside or on the outer surface of the bed 11 to detect the temperature of the bed 11, a second temperature sensor 12*a* disposed inside or on the outer surface of the column 12 to detect the temperature of the column 12, and a third temperature sensor 13*a* disposed inside or on the outer surface of the spindle head 13 to detect the temperature of the spindle head 13.

The cutting fluid F is stored in the storage tank 2. The storage tank 2 houses a spindle center-through ejection pump 21, a cutting fluid ejection pump 22, a machine interior cleaning pump 23, a first temperature control device 24, and a second temperature control device 25.

The spindle center-through ejection pump 21 is a pump for applying pressure to the cutting fluid F stored in the storage tank 2 in order to supply the cutting fluid F to the spindle center-through flow passage configured with the in-spindle flow passage 15*a* and the in-tool flow passage Ta of the machine tool 1. The cutting fluid ejection pump 22 is a pump for applying pressure to the cutting fluid F stored in the storage tank 2 in order to supply the cutting fluid F to the cutting fluid ejection nozzle 16 of the machine tool 1. The machine interior cleaning pump 23 is a pump for applying pressure to the cutting fluid F stored in the storage tank 2 in order to supply the cutting fluid F to the machine interior cleaning nozzle 17 of the machine tool 1.

The first temperature control device 24 and the second temperature control device 25 are disposed to adjust and maintain the temperature of the cutting fluid F at a predetermined temperature, and a heater for heating the cutting fluid F and/or a cooler for cooling the cutting fluid F are/is used as such a device in general. The first temperature control device 24 and the second temperature control device 25 are capable of adjusting the temperature of the cutting fluid F, respectively and independently.

The first temperature control device 24 is connected to the spindle center-through ejection pump 21 so as to allow the cutting fluid F to circulate between the first temperature control device 24 and the spindle center-through ejection pump 21, and is also connected to the cutting fluid ejection pump 22 so as to allow the cutting fluid F to circulate between the first temperature control device 24 and the cutting fluid ejection pump 22. Accordingly, the cutting fluid F to be supplied to the machine tool 1 by the driving of the spindle center-through ejection pump 21 and the cutting fluid F to be supplied to the machine tool 1 by the driving of the cutting fluid ejection pump 22 are adjusted and maintained commonly by the first temperature control device 24 at a predetermined temperature.

On the other hand, the second temperature control device 25 is connected to the machine interior cleaning pump 23 so as to allow the cutting fluid F to circulate between the second temperature control device 25 and the machine interior cleaning pump 23. Accordingly, the cutting fluid F to be supplied to the machine tool 1 by the driving of the machine interior cleaning pump 23 is adjusted and maintained at a predetermined temperature by the second temperature control device 25.

A first connection flow passage 32, a second connection flow passage 42, and a third connection flow passage 52, which are configured with pipes respectively, are connected between the machine tool 1 and the storage tank 2.

The first connection flow passage 32 is a flow passage for supplying to the machine tool 1 the cutting fluid F to be ejected from the tip of the tool T. One end side of the first connection flow passage 32 is connected to the ejection side of the spindle center-through ejection pump 21 included in the storage tank 2. The other end side of the first connection flow passage 32 is connected to the first in-structure cutting fluid flow passage 31 which is opened on the outer surface of the column 12. Accordingly, when the spindle center-through ejection pump 21 is driven to apply pressure to the cutting fluid F stored in the storage tank 2, the cutting fluid F having been adjusted in temperature by the first temperature control device 24 is supplied through the first connection flow passage 32, the first in-structure cutting fluid flow passage 31, the in-spindle flow passage 15*a*, and the in-tool flow passage Ta and is ejected from the tool ejection port Tb disposed at the tip of the tool T.

In the present embodiment, a first cutting fluid flow passage 3 is configured with the first in-structure cutting fluid flow passage 31 and the first connection flow passage 32. A first open/close valve 33 is configured with, for example, an electromagnetic valve in the middle of the first connection flow passage 32 to open and close the first connection flow passage 32.

The second connection flow passage 42 is a flow passage for supplying to the machine tool 1 the cutting fluid F to be ejected from the cutting fluid ejection nozzle 16. One end side of the second connection flow passage 42 is connected to the ejection side of the cutting fluid ejection pump 22 included in the storage tank 2. The other end side of the second connection flow passage 42 is connected to the second in-structure cutting fluid flow passage 41 which is opened on the outer surface of the column 12. Accordingly, when the cutting fluid ejection pump 22 is driven to apply pressure to the cutting fluid F stored in the storage tank 2, the cutting fluid F having been adjusted in temperature by the first temperature control device 24 is supplied through the second connection flow passage 42, the second in-structure cutting fluid flow passage 41, and the cutting fluid ejection nozzle 16 and is ejected from the cutting fluid ejection port 16*a* disposed at the tip of the cutting fluid ejection nozzle 16.

In the present embodiment, a second cutting fluid flow passage 4 is configured with the second in-structure cutting fluid flow passage 41 and the second connection flow passage 42. A second open/close valve 43 is configured with, for example, an electromagnetic valve in the middle of the second connection flow passage 42 to open and close the second connection flow passage 42.

The third connection flow passage 52 is a flow passage for supplying to the machine tool 1 the cutting fluid F to be ejected from the machine interior cleaning nozzle 17. One end side of the third connection flow passage 52 is connected to the ejection side of the machine interior cleaning pump 23 included in the storage tank 2. The other end side of the third connection flow passage 52 is connected to the third in-structure cutting fluid flow passage 51 which is opened on the outer surface of the bed 11. Accordingly, when the machine interior cleaning pump 23 is driven to apply pressure to the cutting fluid F stored in the storage tank 2, the cutting fluid F having been adjusted in temperature by the second temperature control device 25 is supplied through the third connection flow passage 52, the third in-structure cutting fluid flow passage 51, and the machine interior cleaning nozzle 17 and is ejected from the cleaning fluid ejection port 17*a* disposed at the tip of the machine interior cleaning nozzle 17.

In the present embodiment, a third cutting fluid flow passage 5 is configured with the third in-structure cutting fluid flow passage 51 and the third connection flow passage 52. A third open/close valve 53 is configured with, for example, an electromagnetic valve in the middle of the third connection flow passage 52 to open and close the third connection flow passage 52.

As shown in FIG. 2, the spindle center-through ejection pump 21, the cutting fluid ejection pump 22, and the machine interior cleaning pump 23 are disposed to be controllable in driving by a control unit 6. The first temperature control device 24 and the second temperature control device 25 included in the storage tank 2 are disposed to be controllable in temperature setting by the control unit 6. The first open/close valve 33, the second open/close valve 43 and the third open/close valve 53 are disposed to be controllable in opening/closing by the control unit 6. The control unit 6 receives the respective detection values of the first temperature sensor 11a, the second temperature sensor 12a, and the third temperature sensor 13a, which are disposed in the machine tool 1. The control unit 6 may serve as a control unit dedicated to the cutting fluid supplying device 100 or may be used commonly as a control unit for controlling the machine tool 1.

The description below pertains to a case where, in the cutting fluid supplying device 100, the cutting fluid F is supplied from the storage tank 2 to the spindle center-through flow passage, the cutting fluid ejection nozzle 16, and the machine interior cleaning nozzle 17 of the machine tool 1, respectively. It is noted that the description below is about the case where the structure body 10 of the machine tool 1 is cooled by the cutting fluid F. It is assumed that each of the first temperature control device 24 and the second temperature control device 25 has a function capable of heating and cooling the cutting fluid F.

Firstly, in the case where the cutting fluid F is supplied to the spindle center-through flow passage configured with the in-spindle flow passage 15a and the in-tool flow passage Ta of the machine tool 1, the spindle center-through ejection pump 21 is driven by the control unit 6. Accordingly, pressure is applied to the cutting fluid F stored in the storage tank 2, and the cutting fluid F is supplied through the first cutting fluid flow passage 3 to the in-spindle flow passage 15a and the in-tool flow passage Ta.

The cutting fluid F exchanges heat with the spindle head 13 during the supplying process while flowing and winding through the spindle head 13 along the first in-structure cutting fluid flow passage 31, whereby the spindle head 13 is cooled. Especially for the spindle head 13, its temperature rises due to the heat generated by the rotational driving of a spindle motor (not shown). Since the spindle head 13 is able to exchange heat with the cutting fluid F flowing through the first in-structure cutting fluid flow passage 31 disposed inside of it, the temperature rise of the spindle head 13 under operation of the machine tool 1 is suppressed, and as a result, the occurrence of thermal displacement of the spindle head 13 is also suppressed.

The cutting fluid F supplied through the first cutting fluid flow passage 3 is finally ejected toward the workpiece W from the tool ejection port Tb of the tool T during machining. That is, the cutting fluid F does not return from the spindle head 13 directly to the storage tank 2 after cooling the spindle head 13. Therefore, there is no need to dispose a dedicated circulation pump for returning the cutting fluid F inside the spindle head 13 to the storage tank 2.

In the case where the cutting fluid F is supplied to the cutting fluid ejection nozzle 16, the cutting fluid ejection pump 22 is driven by the control unit 6. Accordingly, pressure is applied to the cutting fluid F stored in the storage tank 2, and the cutting fluid F is supplied through the second cutting fluid flow passage 4 to the cutting fluid ejection nozzle 16.

The cutting fluid F exchanges heat with the column 12 during the supplying process while flowing and winding through the column 12 along the second in-structure cutting fluid flow passage 41, whereby the column 12 is cooled. Accordingly, the temperature rise of the column 12 under operation of the machine tool 1 is suppressed, and as a result, the occurrence of thermal displacement of the column 12 is also suppressed.

The cutting fluid F supplied through the second cutting fluid flow passage 4 is finally ejected from the cutting fluid ejection port 16a of the cutting fluid ejection nozzle 16 toward the workpiece W and the periphery thereof. That is, the cutting fluid F does not return from the column 12 directly to the storage tank 2 after cooling the column 12. Therefore, there is no need to dispose a dedicated circulation pump for returning the cutting fluid F inside the column 12 to the storage tank 2.

In the case where the cutting fluid F is supplied to the machine interior cleaning nozzle 17, the machine interior cleaning pump 23 is driven by the control unit 6. Accordingly, pressure is applied to the cutting fluid F stored in the storage tank 2, and the cutting fluid F is supplied through the third cutting fluid flow passage 5 to the machine interior cleaning nozzle 17.

The cutting fluid F exchanges heat with the bed 11 during the supplying process while flowing and winding through the bed 11 along the third in-structure cutting fluid flow passage 51, whereby the bed 11 is cooled. Especially for the bed 11, its temperature rises due to the heat generated by the rotational driving of a motor (not shown) for the table 14. Since the bed 11 is able to exchange heat with the cutting fluid F flowing through the third in-structure cutting fluid flow passage 51 disposed inside of it, the temperature rise of the bed 11 under operation of the machine tool 1 is suppressed, and as a result, the occurrence of thermal displacement of the bed 11 is also suppressed.

The cutting fluid F supplied through the third cutting fluid flow passage 5 is finally ejected from the cleaning fluid ejection port 17a of the machine interior cleaning nozzle 17 toward the workpiece W and the bed 11 in the periphery of the workpiece W. That is, the cutting fluid F does not return from the bed 11 directly to the storage tank 2 after cooling the bed 11. Therefore, there is no need to dispose a dedicated circulation pump for returning the cutting fluid F inside the bed 11 to the storage tank 2.

As described above, in the cutting fluid supplying device 100, the cutting fluid F is supplied from the storage tank 2 to the machine tool 1, thereby suppressing thermal displacement of the structure body 10 of the machine tool 1. The configuration for suppressing the thermal displacement is realized in a simple configuration in which the first in-structure cutting fluid flow passage 31, the second in-structure cutting fluid flow passage 41, and the third in-structure cutting fluid flow passage 51 are formed so as to allow the cutting fluid F to flow inside the structure body 10 of the machine tool 1. Moreover, there is no need to perform a wasteful warming-up operation until the temperature of the structure body 10 of the machine tool 1 reaches an equilibrium temperature.

While the cutting fluid F is being supplied to the machine tool 1, the respective temperatures of the bed 11, the column 12 and the spindle head 13 are detected by the first temperature sensor 11a, the second temperature sensor 12a, and the third temperature sensor 13a and are input to the control unit 6. The control unit 6 monitors the respective detection values input by the first temperature sensor 11a, the second temperature sensor 12a, and the third temperature sensor 13a constantly or at every fixed time and determines whether or not each of the temperatures of the bed 11, the column 12, and the spindle head 13 reaches a predetermined target temperature for suppressing the thermal displacement.

In the case where any one or more of the detection values of the first temperature sensor 11a, the second temperature sensor 12a, and/or the third temperature sensor 13a remain exceeding the predetermined temperature, the control unit 6 adjusts and lowers the set temperature of the first temperature control device 24 and/or the set temperature of the second temperature control device 25. For example, in the case where only the temperature of the bed 11 in the structure body of the machine tool 1 exceeds the predetermined temperature, the control unit 6 adjusts and lowers the set temperature of the second temperature control device 25 so as to further cool the cutting fluid F and supplies the cutting fluid F cooled to a lower temperature to the third cutting fluid flow passage 5 in the bed 11 by use of the machine interior cleaning pump 23.

In the case where any one or more of the detection values of the first temperature sensor 11a, the second temperature sensor 12a, and/or the third temperature sensor 13a are lower than the predetermined temperature, the control unit 6 adjusts and raises the set temperature of the first temperature control device 24 and/or the set temperature of the second temperature control device 25. For example, in the case where only the temperature of the bed 11 in the structure body 10 of the machine tool 1 is lower than the predetermined temperature, the control unit 6 adjusts and raises the set temperature of the second temperature control device 25 so as to heat the cutting fluid F, and supplies the heated cutting fluid F to the third cutting fluid flow passage 5 in the bed 11 by use of the machine interior cleaning pump 23.

As described above, the cutting fluid supplying device 100 adjusts the temperature of the cutting fluid F stored in the storage tank 2 by the respective temperature control devices 24, 25 on the basis of the detection values of the temperature sensors 11a, 12a, 13a, thereby enabling to adequately control the temperature of the structure body 10 of the machine tool 1 to a predetermined temperature.

Since each of the first temperature control device 24 and the second temperature control device 25 in the present embodiment is capable of independent temperature control, the bed 11, the column 12, and the spindle head 13 are enabled to be easily adjusted to a uniform predetermined temperature, even if the bed 11, the column 12, and the spindle head 13 are ununiformly cooled by the cutting fluid F due to, for example, the difference in thermal capacity between the bed 11, the column 12, and the spindle head 13.

In the above description, the structure body 10 of the machine tool 1 is cooled by the cutting fluid F to a predetermined temperature. Alternatively, the cutting fluid supplying device 100 may have a configuration in which the cutting fluid F is heated by the first temperature control device 24 and the second temperature control device 25, whereby the cutting fluid F heats the structure body 10 of the machine tool 1 to a predetermined temperature.

In the case where the temperature of the structure body 10 becomes lower than the predetermined temperature when the structure body 10 of the machine tool 1 is cooled by the cutting fluid F, or in the case where the temperature of the structure body 10 becomes higher than a predetermined temperature when the structure body 10 of the machine tool 1 is heated by the cutting fluid F, the control unit 6 may close the first open/close valve 33, the second open/close valve 43, and the third open/close valve 53 to stop supplying the cutting fluid F without adjusting the set temperature of the first temperature control device 24 and/or the set temperature of the second temperature control device 25. At this time, the spindle center-through ejection pump 21, the cutting fluid ejection pump 22 and the machine interior cleaning pump 23 are able to be driven continuously. Therefore, the cutting fluid F stored in the storage tank 2 is able to circulate between each of the pumps and the first temperature control device 24 or the second temperature control device 25, and the temperature of the cutting fluid F is maintained at a desired temperature. Accordingly, the cutting fluid F at a desired temperature is able to be supplied promptly at the time of restarting the supply of the cutting fluid F.

It is noted that the first open/close valve 33, the second open/close valve 43, and the third open/close valve 53 may be flow rate adjustment valves. In this case, the flow rate of the cutting fluid F supplied to the machine tool 1 may be adjusted by the first open/close valve 33, the second open/close valve 43 and the third open/close valve 53, instead of or in addition to the temperature control of the cutting fluid F by the first temperature control device 24 and the second temperature control device 25.

In the case of adjusting the temperature of the structure body 10 of the machine tool 1, the control unit 6 may control the ejection amounts of the spindle center-through ejection pump 21, the cutting fluid ejection pump 22, and the machine interior cleaning pump 23.

Although the first cutting fluid flow passage 3, the second cutting fluid flow passage 4, and the third cutting fluid flow passage 5 in the present embodiment are disposed so as to penetrate through the inside of the structure body 10 of the machine tool 1, the present invention is not limited to this. The first cutting fluid flow passage 3, the second cutting fluid flow passage 4, and the third cutting fluid flow passage 5 may be disposed on the outer surface of the structure body 10, that is, disposed on the outer surface of the spindle head 13, the outer surface of the column 12, and the outer surface of the bed 11.

At least one of the tool ejection port Tb, the cutting fluid ejection port 16a, and the cleaning fluid ejection port 17a may be provided as an ejection port for ejecting the cutting fluid F stored in the storage tank 2. Accordingly, in the case where the machine tool 1 is configured to eject the cutting fluid F only from, for example, the cutting fluid ejection port 16a, only the second cutting fluid flow passage 4 may be disposed. In such as case, the second cutting fluid flow passage 4 may be disposed so as to penetrate through or disposed on the outer surfaces of all the bed 11, the column 12, and the spindle head 13. Additionally, at least one pump and at least one temperature control device may be disposed in the storage tank 2.

EXPLANATION OF REFERENCE NUMERALS

1 MACHINE TOOL
10 STRUCTURE BODY
11 BED
11a FIRST TEMPERATURE SENSOR
12 COLUMN
12a SECOND TEMPERATURE SENSOR
13 SPINDLE HEAD
13a THIRD TEMPERATURE SENSOR
16a CUTTING FLUID EJECTION PORT
17a CLEANING FLUID EJECTION PORT

2 STORAGE TANK
21 SPINDLE CENTER-THROUGH EJECTION PUMP
22 CUTTING FLUID EJECTION PUMP
23 MACHINE INTERIOR CLEANING PUMP
24 FIRST TEMPERATURE CONTROL DEVICE
25 SECOND TEMPERATURE CONTROL DEVICE
3 FIRST CUTTING FLUID FLOW PASSAGE
4 SECOND CUTTING FLUID FLOW PASSAGE
5 THIRD CUTTING FLUID FLOW PASSAGE
100 CUTTING FLUID SUPPLYING DEVICE
F CUTTING FLUID
Tb TOOL EJECTION PORT

What is claimed is:

1. A cutting fluid supplying device, comprising:
a machine tool having a structure body and at least one ejection port for ejecting a cutting fluid, the structure body having a bed, a column disposed on the bed, and a spindle head disposed to the column;
a storage tank for storing the cutting fluid to be supplied to the machine tool;
a cutting fluid flow passage connecting the storage tank and the ejection port;
at least one pump for applying pressure to the cutting fluid to supply the cutting fluid stored in the storage tank to the cutting fluid flow passage; at least one temperature sensor for detecting a temperature of the structure body; and
at least one temperature control device for adjusting a temperature of the cutting fluid stored in the storage tank so as to make the temperature of the structure body detected by the temperature sensor identical to a predetermined temperature,
wherein the cutting fluid flow passage has a first cutting fluid flow passage disposed to penetrate through or disposed on an outer surface of the spindle head, a second cutting fluid flow passage disposed to penetrate through or disposed on an outer surface of the column, and a third cutting fluid flow passage disposed to penetrate through or disposed on an outer surface of the bed, heat exchange being possible between the cutting fluid and the spindle head via the first cutting fluid flow passage in which the cutting fluid flows and winds through the spindle head along the first cutting fluid flow passage, heat exchange being possible between the cutting fluid and the column via the second cutting fluid flow passage in which the cutting fluid flows and winds through the column along the second cutting fluid flow passage, and heat exchange being possible between the cutting fluid and the bed via the third cutting fluid flow passage in which the cutting fluid flows and winds through the bed along the third cutting fluid flow passage, the temperature control device has a first temperature control device for adjusting the temperature of the cutting fluid to be supplied to the first cutting fluid flow passage and the second cutting fluid flow passage, respectively, and a second temperature control device for adjusting the temperature of the cutting fluid to be supplied to the third cutting fluid flow passage, each of the first temperature control device and the second temperature control device is capable of independently controlling the temperature of the cutting fluid, and the first cutting fluid flow passage, the second cutting fluid flow passage and the third cutting fluid flow passage are each supplied with cutting fluid from a different pump.

* * * * *